United States Patent
Barnett et al.

(10) Patent No.: US 6,192,223 B1
(45) Date of Patent: Feb. 20, 2001

(54) APPARATUS AND METHOD FOR AUTOMATICALLY PROGRAMMING FREQUENCY SCANNING RADIO RECEIVERS

(76) Inventors: Richard E. Barnett, 99 E. Central St., Natick, MA (US) 01760; Philip L. Henry, 1843 Somersby Way, Henderson, NV (US) 89014

(*) Notice: Under 35 U.S.C. 154(b), the term of this patent shall be extended for 0 days.

(21) Appl. No.: 09/122,880

(22) Filed: Jul. 28, 1998

Related U.S. Application Data

(60) Provisional application No. 60/054,317, filed on Jul. 29, 1997.

(51) Int. Cl.⁷ .................................................. H04B 1/18
(52) U.S. Cl. .................................. 455/164.2; 455/186.1; 455/161.1
(58) Field of Search ........................ 455/160.1, 161.1, 455/161.2, 164.1, 164.2, 186.1, 186.2, 452, 45, 179.1

(56) References Cited

U.S. PATENT DOCUMENTS

| | | | |
|---|---|---|---|
| 5,471,662 | * 11/1995 | Shiota | 455/186.1 |
| 5,535,442 | * 7/1996 | Kishi | 455/160.1 |

* cited by examiner

Primary Examiner—Nay Maung
Assistant Examiner—Quochien B. Vuong
(74) Attorney, Agent, or Firm—Leydig, Voit & Mayer, Ltd.

(57) ABSTRACT

A frequency scanning radio receiver programming system includes a frequency scanning radio receiver that scans and receives transmissions on discrete radio frequencies. The frequency scanning radio receiver is automatically programmable to monitor frequencies in a geographical area where the receiver is located. A host system including data bases of frequency allocation and geographical information assembles and sends frequency data to the frequency scanning radio receiver to program the receiver to monitor local radio frequency transmissions. The frequency data also includes identification of the transmitting parties and the frequency scanning radio receiver displays identification information to a listener.

20 Claims, 6 Drawing Sheets

APPARATUS AND METHOD FOR AUTOMATICALLY PROGRAMMING FREQUENCY SCANNING RADIO RECEIVERS

This application claims benefit of Provisional No. 60/054,317 filed Jul. 29, 1994.

BACKGROUND

The present invention relates to frequency scanning radio receivers. More particularly, the present invention relates to automatically programming the receiving frequencies of frequency scanning radio receivers.

Conventional frequency scanning radio receivers monitor radio transmissions by continually tuning the receiver, i.e., scanning, a group of discrete frequencies. When a transmission is detected on a frequency to which the receiver tunes, and the transmission signal level exceeds a threshold, tuning stops and the transmission is monitored. A radio receiver can only receive transmissions within a limited geographic area. The transmissions of usual interest to listeners are assigned to discrete frequencies, for example, to police, emergency medical services, fire, and public service agencies. Other local transmissions, for example, transmissions from local businesses, may not be of interest to the listener. Therefore, the listener must determine the frequencies of interest that are to be monitored and tune or program the frequency scanning receiver so that only those frequencies are monitored.

Historically, scanning radio receivers are manually programmable, i.e., the listener manually inputs the frequencies to be monitored. The frequencies of interest are established by experience, from Federal Communications Commission (FCC) licenses, by purchase of channel listings from a private source, or otherwise. Privately published frequency allocations are frequently out-of-date.

Manually programming a radio receiver to monitor selected channels is an onerous and time consuming task that is subject to data entry errors. Programming a radio receiver involves consulting an owner's manual, and manually entering programming data and each frequency to be monitored using an input device, such as a keypad.

A frequency scanning radio receiver requires reprogramming whenever the listener changes geographic areas. The difficulty and time required to program and reprogram a conventional scanning radio receiver has led to listener frustration and is a major cause of return of frequency scanning radio receivers to retailers and manufacturers for refunds. Accordingly, there exists a need for a frequency scanning radio receiver that overcomes the problems of manual programming of frequencies of interest.

Another problem for the listener is the inability to easily identify a transmitting party being heard. Some conventional frequency scanning radio receivers include a visual display of the frequency being received. To determine the identity of a transmitting party the listener must know the frequency allocations from experience, consult a chart, or analyze the content of the transmission. These methods of identifying the transmitting party are cumbersome and unreliable and, thus, are not desirable. Accordingly, there exists a need for a frequency scanning radio receiver that signals to the listener the identity of the transmitting party.

SUMMARY OF THE INVENTION

An object of the present invention is to provide a frequency scanning radio receiver in which the receiving frequencies of interest are automatically programmable into the receiver.

Another object of the present invention is to provide a frequency scanning radio receiver in which the receiving frequencies of interest in a local area specified by the listener are automatically programmed into the receiver from a remote location.

Another object of the present invention is to provide a frequency scanning radio receiver that displays the identity of a transmitting party to the listener.

Another object of the present invention is to provide a host system that stores frequency allocation information for geographic locations and for assembling and transmitting frequency allocation information for any location, upon request, for programming receiving frequencies into a frequency scanning radio receiver.

According to a first aspect of the present invention, a programmable frequency scanning radio receiver comprises a receiver for receiving radio frequency transmissions at each of a plurality of discrete frequencies; a memory for storing frequency data, the frequency data including a plurality of frequencies corresponding to respective transmitting parties of interest; a processing circuit coupled to the memory and the receiver, accessing the memory, and controlling the receiver to monitor transmissions at each of the frequencies of the frequency data; and a communication device coupled to the processing circuit for communicating with a host system located remotely from the receiver and for receiving the frequency data from the host system, the processing circuit storing the frequency data in the memory, whereby the frequencies received by the receiver can be established and altered from a data base in the host system.

According to another aspect of the present invention, a host system for programming a frequency scanning radio receiver comprises a communication device for transmitting frequency data to a frequency scanning radio receiver in response to a programming request; a memory for storing frequency allocation information for each of a plurality of transmitting parties; and means for extracting and processing a portion of the frequency allocation information from the memory in response to the programming request to produce the frequency data. FIX According to another aspect of the present invention, a frequency scanning radio receiver programming system for programming frequency scanning radio receivers, comprises a host system including a memory device for storing a plurality of operating frequencies for a plurality of transmitting parties; a processing circuit coupled to the memory device for extracting programming data from the memory device; a communication device coupled to the processing circuit for sending the programming data to the scanning radio; a scanning frequency radio receiver including a communication device for receiving the programming data from the host system; a receiver for scanning and receiving a range of radio frequency transmissions, the receiver being programmable a subset of the range of operating frequencies; a memory device for storing the programming data received from the host system; and a processing circuit coupled to the communication device, the memory device, and the receiver for controlling the receiver based on the programming data.

According to yet another aspect of the present invention, a method for automatically programming a frequency scanning radio receiver to monitor transmissions on a set of discrete frequencies comprising transmitting a programming request for a frequency scanning radio receiver to a host system, the programming request including a geographical location of the frequency scanning radio receiver; in response to the programming request, assembling frequency data including respective operating frequencies for a plurality of transmitting parties proximate the geographical location of the frequency scanning radio receiver; transmitting the frequency data from the host system to the frequency scanning radio receiver; and in response to the frequency data received from the host system, programming the frequency scanning radio receiver to monitor transmissions on the operating frequencies.

DETAILED DESCRIPTION OF PREFERRED EMBODIMENTS

Figure 1:
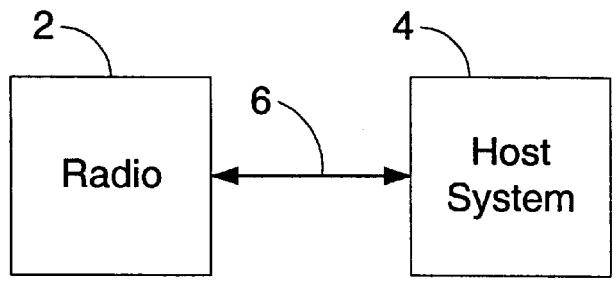
FIG. 1 is a block diagram of a frequency scanning radio receiver programming apparatus according to an embodiment of the present invention.

An embodiment of a frequency scanning radio receiver programming apparatus according to the present invention is illustrated in FIG. 1. The frequency scanning radio receiver programming apparatus comprises a frequency scanning radio receiver 2, a host system 4, and a communication medium 6. The frequency scanning radio receiver 2 includes a tuner that sequentially scans radio frequencies that are selected or specified by a listener and stored in the receiver. The frequency scanning radio receiver 2 includes a memory and a processing circuit for controlling operation and programming the receiver. The processing circuit controls the receiver according to a control program stored in the memory.

According to an important aspect of the present invention, the frequencies to be monitored by the frequency scanning radio receiver 2 are automatically programmable from outside the receiver and may be changed at will. More particularly, the frequency scanning radio receiver 2 receives frequency data from the host system 4 through the communication medium 6, in response to an inquiry, and programs the receiver frequencies using that data. The radio receiver 2 includes a communication device, such as a modem, electronic or acoustical, or a specialized receiver section, to receive the frequency data from the host system 4. In some embodiments, the communication device sends a programming request from the frequency scanning radio receiver 2 to the host system 4 and receives the frequency data from the host system 4. In other embodiments, the listener sends a programming request through one communication medium, and the communication device receives the frequency data through another communication medium. In still other embodiments, the radio receiver 2 may utilize the same receiver to monitor radio frequency transmissions and to receive the frequency data. The scanning radio receiver 2 may also be manually programmable through a user interface, such as a keypad.

The host system 4 embodying the present invention comprises a processing circuit for processing programming requests from the frequency scanning radio receiver 2. The host system assembles frequency data to be sent to the frequency scanning radio receiver 2 in response to a programming request. The host system 4 includes a memory device that stores a control program for the processing circuit, operating frequency allocation information, such as licensee, location, frequency, usage type, and associated geographic information. The host system uses the geographic information in responding to a programming request and assembling frequency data for a specific geographical area to be sent to a frequency scanning radio receiver. However, the present invention is not limited to using geographic information to assemble frequency data. Any information that enables the host system to assemble operating frequencies of interest for a listener is within the scope of the invention. The host system 4 also includes a communication device, such as a modem, for communicating with the frequency scanning radio receiver 2.

The communication medium 6 comprises any medium suitable for transferring data between the host system 4 and the frequency scanning radio receiver 2. For example, if the host system 4 and a frequency scanning radio receiver 2 each include a modem, the communication medium may comprise a telephone network. In an alternative embodiment, the host system 4 and the frequency scanning radio receiver 2 may communicate using a wireless medium, such as a mobile telephone, pager network, and/or satellite network. In another alternative, the host system 4 and the frequency scanning radio receiver 2 may communicate using a combination of different media. For example, a programming information request may be sent by a telephone network and the frequency data may be received by the same receiver or part of the same receiver that is used to monitor radio frequency transmissions, i.e., the frequency scanning receiver.

Although the illustrated embodiment depicts a single host system 4 and a single scanning radio receiver 2, the present invention is not so limited. In a preferred embodiment, a single host system creates and electronically transmits frequency data to a multitude of frequency scanning radio receivers.

Further, the programming system may include more than one host system for creating and electronically transmitting frequency data to frequency scanning radio receivers. A plurality of host systems enables the programming system to receive and process programming requests from a plurality of radios efficiently, even when multiple programming requests are received simultaneously.

Figure 2:
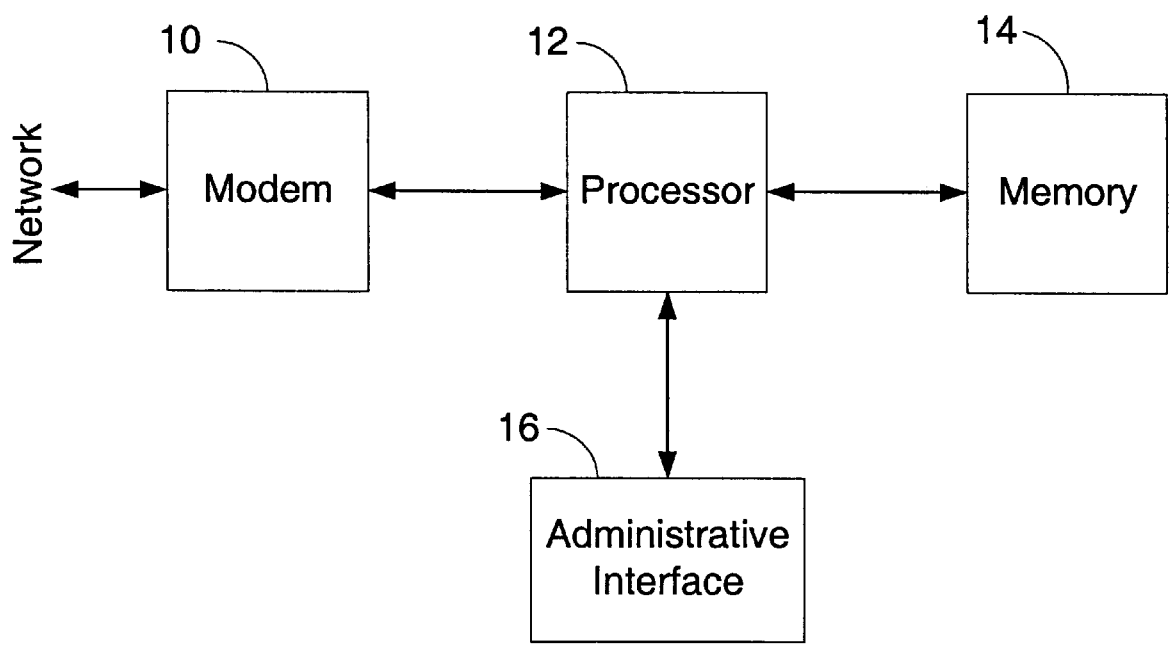
FIG. 2 is a block diagram of a host system according to an embodiment of the present invention.

FIG. 2 is a block diagram of a host system embodying the present invention. In the illustrated embodiment, the host system communicates with the frequency scanning radio receiver through a telephone network using a modem 10. The modem 10 sends frequency data to the frequency scanning radio receiver. In a preferred embodiment, the modem 10 also receives programming requests from the frequency scanning radio receiver including a modem. The modem 10 may comprise an analog modem or a digital modem, for example, an ISDN modem.

The host system includes a memory 14 and a processing circuit 12 for controlling the host system. Exemplary host system operations include receiving programming requests from a frequency scanning radio receiver, storing the frequency allocation information, creating customized frequency data for a frequency scanning radio receiver in response to a programming request, and delivering the customized frequency data to the requesting frequency scanning radio receiver. In a preferred embodiment, the processing circuit 12 comprises a microprocessor that executes programs stored in the memory 14. An administrative interface 16 comprises an input device, such as a keyboard, a display device, such as a video display, and a software interface for modifying operation of the host system. In a preferred embodiment, the host system including the administrative interface comprises a personal computer.

The memory 14 of the host system stores geographic information and the frequency allocation information. In a preferred embodiment, the memory 14 includes a geographic information database comprising the geographical information and a frequency allocation database storing the frequency allocation information, preferably taken from FCC records. The geographic information database comprises geographical information used to convert a programming request from a frequency scanning radio receiver into a format suitable for searching the frequency allocation database for frequency allocation information corresponding to the listener's geographic area. The information in the databases is used to assemble frequency data in response to a programming request.

In automatic programming, the processing circuit 12 uses a code, such as a postal code, for example, a zip code, indicating the location of the frequency scanning radio receiver and supplied in a programming request to extract geographic information from the geographic information database. The information extracted from the geographic information database is used to search the frequency allocation database for frequency information. These two databases may be merged into a single database or divided into a larger number of databases.

In a preferred embodiment, the geographic information database comprises postal codes, and a city or town, a county, a state, and a region corresponding to each of the postal codes. The host system uses the postal code in a programming request to identify the geographic location of a frequency scanning radio receiver and to extract frequency and licensee, i.e., user, information from the frequency allocation database. The present invention is not limited to using a postal code to identify the geographic location of a scanning radio receiver. For example, the host system may identify the geographic location of a scanning radio receiver using a telephone number from which the scanning radio receiver or listener contacts the host system. In that case, the geographic data includes information converting telephone number information to location information, such as postal codes or longitude and latitude. The postal codes may also be correlated with longitude and latitude locations. Alternatively, the scanning receiver location may be specified by longitude and latitude, although that data may not be available to a listener. Longitude and latitude data is useful since FCC records usually specify transmitter location using that location data.

In a preferred embodiment, the geographic information database includes cross references for parent communities when a postal code specifies a sub-community. For example, a postal code may specify a sub-community as a town or city. However, records in the frequency allocation database derived from FCC licenses may not contain the name of the sub-community. Accordingly, the host system uses the geographic information database to translate the sub-community corresponding to a postal code into a parent community. For example, if a listener enters zip code "02147", "Brookline Village," which is a sub-community of the city of Brookline, Mass. is specified. Records derived from FCC licenses for the city of Brookline may not be extracted from the second data base using "Brookline Village" as a search key. Accordingly, the host system preferably converts "Brookline Village" into "Brookline" and uses "Brookline" to search the is frequency allocation database.

The frequency allocation database includes a plurality of records. Each record preferably includes a FREQUENCY field, a USER field, and a SERVICE CODE field. An example of a frequency allocation database record is:

| FREQUENCY | USER | SERVICE CODE |
|---|---|---|
| 150.995 | Dunstable, town of | PL |

The FREQUENCY field specifies the frequency in MHz allocated to the user. The USER field indicates the user as listed in an FCC license. The SERVICE CODE field indicates the nature of the use, for example, police, fire, highway service, etc. For example, the sample entry indicates that the local police in the town of Dunstable have been allocated an operating frequency of 150.995 MHz. Additional fields other than those shown in the example may be included in a frequency allocation database record.

Figure 3:
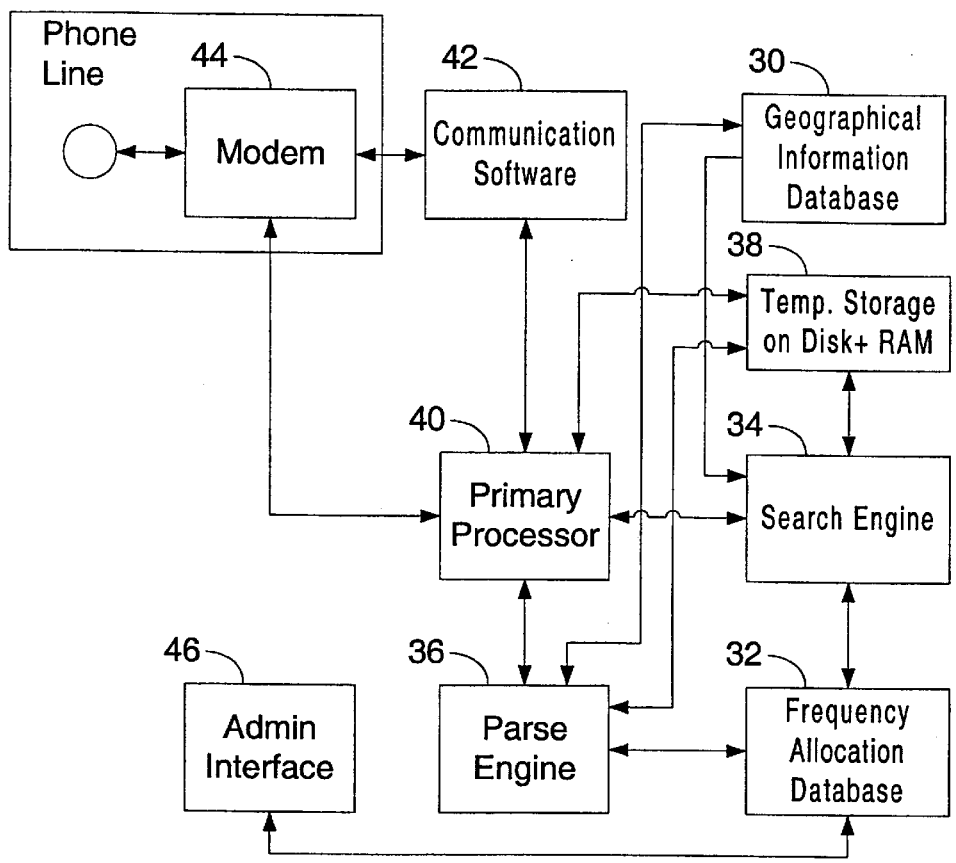
FIG. 3 is a block diagram of a host system according to an embodiment of the present invention.

Referring to FIG. 3, in order to locate data in the databases 30 and 32' the host system includes a search engine 34 for searching the databases. In a preferred embodiment, the search engine 34 is stored in the memory 14 and directs the processing circuit 12 to extract information from the databases. When the geographic information database 30 comprises a plurality of postal codes and a frequency scanning radio listener sends the postal code to the host system, the search engine 34 searches the geographic information database 30 for a postal code. The search engine 34 preferably extracts a city, county, state, and region corresponding to the postal code. The search engine 34 uses these identifiers to extract data sets from the frequency allocation database 32. The data sets correspond to frequency allocations for city, county, state, and regional agencies.

The records extracted by the search engine 34 are preferably limited to service codes PL, PH, PS, PP, GP, GF, YP, and YF. These service codes correspond to records for government, highway, police, and fire. The present invention is not limited to extracting records having these specific service codes but these codes correspond to the transmitting parties of interest to a majority of frequency scanning radio receiver listeners. The search engine 34 may be configured to extract records having any service code of interest to a listener.

For the first data set, the search engine 34 searches the frequency allocation database 32 and extracts the records having a USER field including the city extracted from the geographic information database 30. For the second data set, the search engine 34 extracts records for the county in which the city is located. For the third data set, the search engine 34 extracts records that contain the state in which the city is located. For the fourth data set, the search engine 34 extracts records for cities and towns within a predetermined radius of a longitude and latitude of the city extracted from the postal code data base. The search engine 34 stores these four data sets in a temporary storage location 60.

According to another important feature, the present invention a scanning radio receiver displays the identity of a transmitting party, not merely the transmitting frequency, to a radio operator. Accordingly, the host system includes a parse engine 36 for transforming the data sets extracted from the frequency allocation database 32 into a form for displaying the identity of a transmitting party. The parse engine 36 also transforms data from the databases into a format usable for controlling a frequency scanning radio.

In order to transform the data sets into a format for displaying the identity of a transmitting party, the parse engine 36 first removes duplicate records from the data sets. Removing duplicates includes searching through each of the four data sets, comparing the records, and deleting duplicates. The parse engine 36 next removes unnecessary fields from the data sets. In a preferred embodiment, the fields that remain in the data sets are FREQUENCY, USER, SERVICE CODE, and TX TYPE. Additional fields are preferably deleted to reduce the volume of programming information to be transmitted to a frequency scanning radio receiver.

Once the additional fields are deleted, the parse engine 36 preferably removes records for repeater channels, i.e., channels that are not the source of a transmission but merely relay, on a different frequency, a signal to increase broadcasting range. More particularly, the parse engine 36 uses the TX TYPE field to delete records that are not base channels in repeater systems. The TX TYPE field is used to distinguish repeater channel records from base channel records. For example, records not containing FB2, FB4, or FB* in the TX TYPE field are repeater channel records. Alternatively, the repeater channel records may be omitted from the frequency allocation database 32 from which the data sets are created.

The parse engine 36 next converts the data sets into a format for grouping according to user type. The host system uses the groupings to create transmitting party identification data that is eventually displayed to a listener. The frequency scanning radio receiver may use the groupings to arrange the records into banks and sub-banks in memory. In order to convert the data sets, the parse engine 36 reduces all of the records in the four data sets to three fields: FREQUENCY, USER, and SERVICE CODE. For example, a reduced record may comprise:

| 150.995 | Dunstable, town of | PH. |
|---|---|---|

Figure 4:
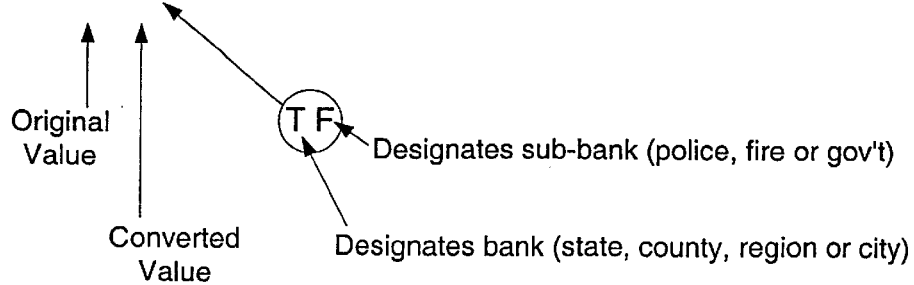
FIG. 4 is a service code conversion table according to an embodiment of the present invention.

Next, the parse engine 36 converts the service codes into a uniform format, e.g., as shown in FIG. 4, to enable a frequency scanning radio receiver to store the entries in banks and sub-banks. For example, for all records in the first data set, corresponding to the listener's town or city, parse engine 36 changes the first character of the service code to "T". For all records in the second data set, corresponding to the listener's county, parse engine 36 changes the first character of the service code to "C". For all records of the third data set, corresponding to the listener's state, the parse engine changes the first character of the service code to "S". Finally, for all entries of the fourth data set, corresponding to the listener's region, the parse engine changes the first character of the service code to "R". Thus, a preferred embodiment uses the characters T, C, S, and R in the converted service codes to distinguish the records according to town or city, county, state, and region, respectively. However, any characters may be used to distinguish the records.

The parse engine 36 converts the USER fields in the data sets into a format that readily identifies a transmitting party to a listener. In a preferred embodiment, for the city and regional data sets, the parse engine 36 removes the comma and all characters to the right of the comma in the USER field, leaving the city or town name in the USER field. Thus, the USER field "Dunstable, town of" becomes "Dunstable". The parse engine 36 then appends a description of the transmitting party to the USER field of each record, according to the last character of the SERVICE CODE field of each record. For example, if the last character of the service code is "F", the parse engine 36 appends the word "Fire" to the USER field. If the last character of the service code is "P", the parse engine 36 appends the word "Police". If the last character is "L", the parse engine 36 appends nothing. The scanning radio receiver that receives the frequency data displays the transformed USER fields to the listener, identifying a transmitting party. For example, if the Dunstable town fire department is transmitting, the radio receiver displays "Dunstable Fire".

For the county data set, the parse engine 36 removes the comma and the characters to the right of the comma in the USER field in each of the records, leaving the county name. The parse engine 36 then appends a description of the transmitting party, according to the last character of the service code of each record. If the last character of the service code is "P", the parse engine 36 appends the words "County Sheriff". If the last letter of the service code is "F", the parse engine 36 appends the words "County Fire". If the last character of the service code is "H", the parse engine appends the words "County Highway". If the last character is "L", only the word "County" is appended. Thus, an example of identification data displayed to a listener is "Orange County Sheriff".

For the state data set, the parse engine 36 removes the comma and the characters to the right of the comma in the USER field of each of the records, leaving the state name. The parse engine 36 then appends a description of the transmitting party, according to the last character of the service code of each record. If the last character of the service code is "P", the parse engine appends the words "State Police". In a preferred embodiment, the parse engine 36 deletes records that do not include the character "P" in the service code, because the only state agency of interest to a majority of listeners is the state police. However, monitoring of other transmissions by other state agencies is within the scope of the invention. An example of data that a frequency scanning radio receiver may display when receiving a transmission from the state police is "Mass State Police".

Although the parse engine 36 prepares the data sets for displaying transmitting party identification information as described, the present invention is not intended to be limited to these examples. Any user information that identifies a transmitting party is within the scope of the invention. For example, when a transmitting party is a business or an individual, the scanning radio may display the name of the business or the individual to the listener.

After preparing the data sets, the parse engine 36 merges the data sets and stores them in the temporary storage location 38. A primary processor 40 then sends a message to the radio receiver indicating that the programming data set is ready for transmission. Once the frequency scanning radio receiver indicates that it is ready to receive the transmission, communication software 42 sends the frequency data, i.e., the information described, not merely frequencies, to the radio through a modem 44 and the telephone network 46.

In order to transmit the frequency data, the communications software 42 may include a derivative of the standard upload/download protocol, such as zmodem. The present invention is not limited to an upload/download protocol derived from zmodem. For example, the upload/download protocol may be derived from xmodem, kermit, or any other protocol suitable for data transfer.

An exemplary programming data set created by the host system for a postal code provided to the host system is as follows:

<BOD>418.5125;Westford Police;TP#033.6000;Westford Fire;TF#155.9250;Westford Highway;TL#154.8510;Acton Police;RP#045.5000;Acton Fire;RF#153.9950;Acton Highway;RL#;408.0875;Bellerica Police;RP#154.9950;Billerica Fire;RF#042.3400;MA State Police;SP#866.5125;MA State Police;SP#045.9400;Middlesex Sheriff;CP#046.0200;Middlesex Sheriff;CP#033.6600;Middlesex Fire;CF#<EOD>.

In the exemplary data set, <BOD> indicates a beginning of data set character, which informs the scanning radio receiver CPU to process data until an end of data set character <EOD> is received. 482.5125 is the frequency of the first record. The radio receiver reads each field until a field separator is received. ";" is used as a field separator in this example. "Westford Police" is a user description to be displayed to a listener. "TP" is the modified service code. "#" is a record separator used to separate records in the data set.

The programming data set example illustrated above includes operating frequencies usable by a scanning radio receiver for tuning to monitor a set of operating frequencies of interest to a listener. The data set also includes user identification information identifying the transmitting party to the radio operator. The format illustrated above is preferred. However, the present invention is not limited to any particular programming data set format.

Although the described host system includes two databases, a parse engine, and a search engine that create the frequency data, the present invention is not limited to such an embodiment. For example, all of the frequency information could be arranged in advance and stored in memory with the corresponding postal code. When a listener transmits a postal code to the host system, the host system may simply look up the postal code and transmit the prepared frequency information to the receiver. Such a system complicates incorporation of frequency allocation changes. In the described embodiment, license changes only require modification of the affected record and are automatically included in the frequency data sent to a scanning radio.

Figure 5:
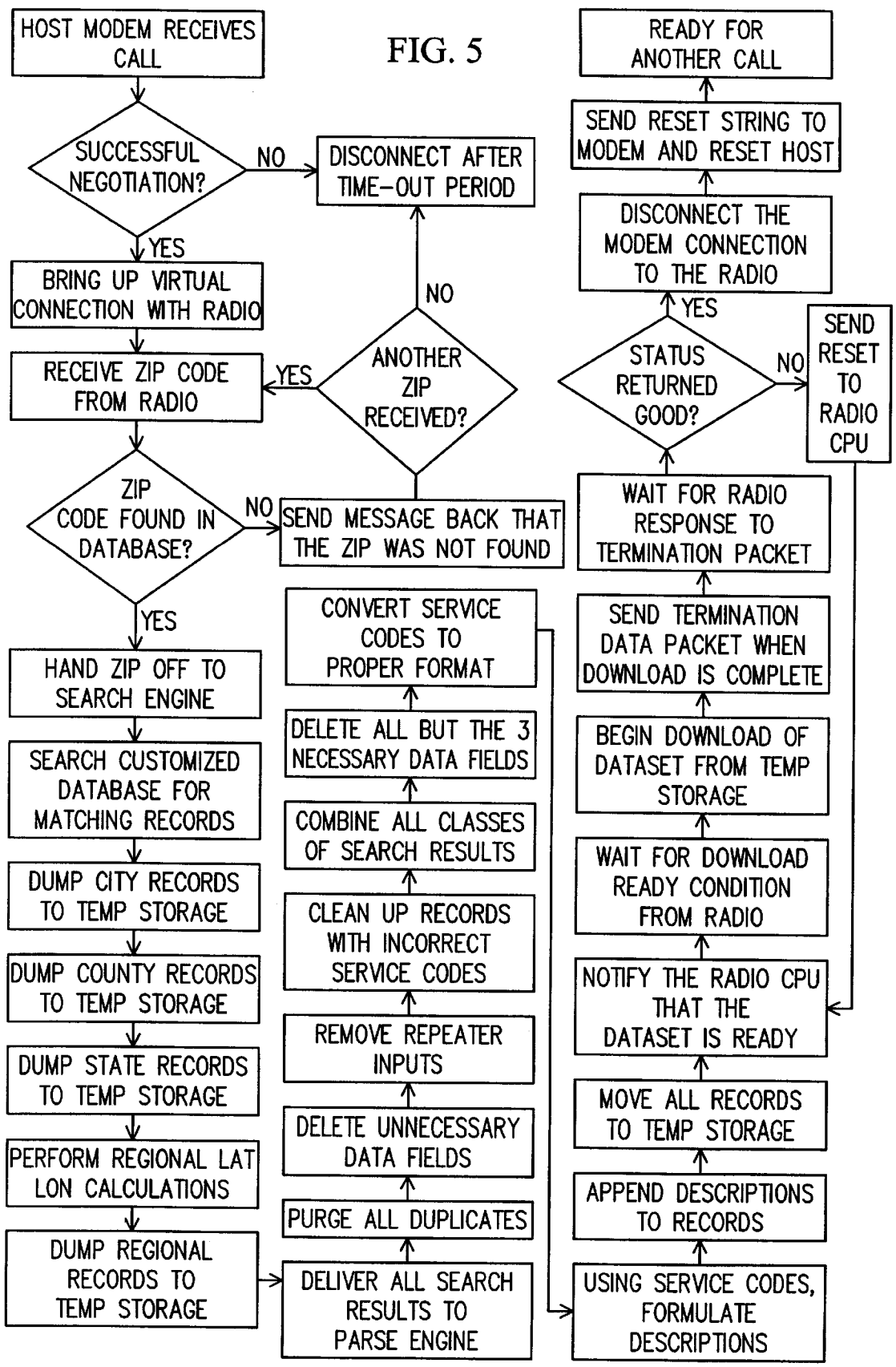
FIG. 5 is a flow chart illustrating an example of the operation of a host system according to an embodiment of the present invention.

Once the host system sends the frequency data to a frequency scanning radio receiver, the host system waits for a signal from the scanning radio that indicates that the frequency data was received successfully. If the frequency data was received successfully, the communications software 42 resets the host modem 52. The host system is then ready to receive a programming request from another frequency scanning radio receiver. If the host system does not receive a signal indicating successful transmission, the host sends a reset signal and resends the frequency data. The process is preferably repeated until the radio receiver indicates that the frequency data has been received successfully. Alternatively, the host system may try to send the frequency data a predetermined number of times before the host system resets to receive another programming request. FIG. 5 is a flow chart illustrating an example of the operation of the host system according to an embodiment of the present invention.

Figure 6:
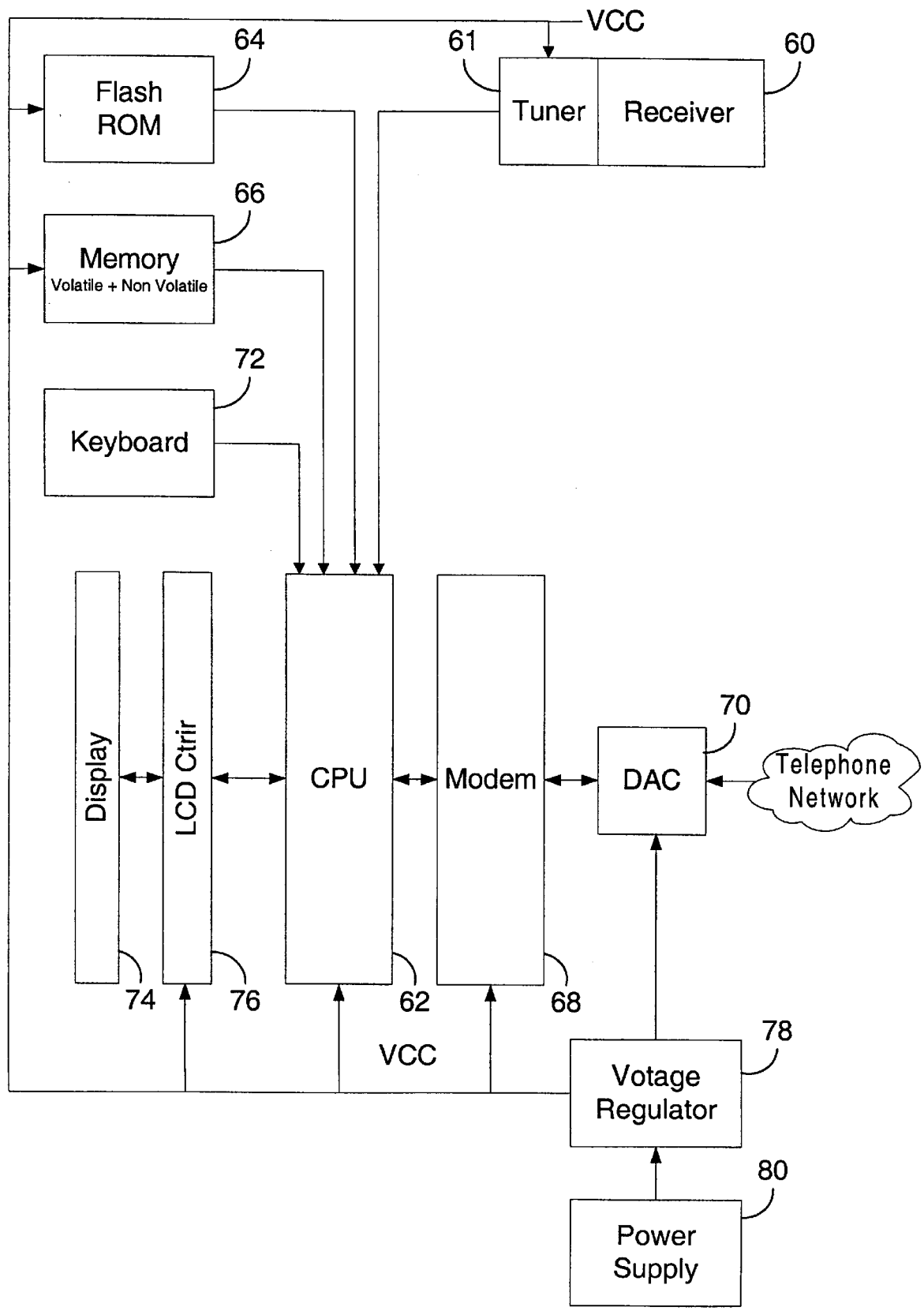
FIG. 6 is a block diagram of a frequency scanning radio receiver according to an embodiment of the present invention.

FIG. 6 is a block diagram of a frequency scanning radio receiver according to an embodiment of the present invention. The radio receiver 60 includes a tuner 61 for frequency scanning and receiving radio frequency transmissions. The tuner 61 is preferably capable of scanning a continuous range of radio frequencies. The tuner 61 may monitor a transmission at any frequency in the range when the transmission signal strength exceeds a sensitivity threshold. In a preferred embodiment, the tuner 61 is automatically programmable to scan a subset of frequencies in the range of frequencies and to exclude transmissions occurring at frequencies not in the subset.

In order to control which frequencies the receiver 60 monitors, a central processing unit (CPU) 62 is coupled to the receiver 60. For example, the CPU 62 may execute a program stored in a memory 64 that reads a table of frequencies stored in another memory 66. When a transmission is detected by the receiver 60, the CPU 62 searches the memory 66 for the transmission frequency. If the CPU 62 finds the frequency, the CPU 62 controls the receiver 60 so that the tuner 61 stops frequency scanning and receives the transmission. If the CPU 62 does not find the frequency, the CPU 62 signals the tuner 61 to continue scanning frequencies. In a preferred embodiment, the CPU 62 comprises a microprocessor.

In order to receive frequency data from the host system, the radio receiver preferably includes a communication device such as a modem 68. The modem 68 may be analog or digital. The modem 68 may be internal or external. In a preferred embodiment, the modem 68 comprises an internal analog modem. The modem 68 includes a digital-to-analog converter (DAC) 70 to convert digital signals from the radio receiver into analog signals suitable for transmission through a telephone network. In embodiments where the modem 68 comprises a digital modem, the DAC 70 may be omitted. In embodiments in which frequency data is received through the receiver 60, the modem 68 may be omitted.

The frequency scanning radio receiver includes one or more memories for storing frequency data sent from the host system and operating programs for controlling receiver functions. The memory 64 according to the illustrated embodiment comprises a flash ROM storing a program for controlling the operation of the frequency scanning radio receiver, such as frequency scanning, receiving frequency data from the host system, and transmitting data to the host system. The memory 66 comprises a volatile portion and a non-volatile portion. The non-volatile portion stores a telephone number for the host system in embodiments where the radio is programmed through a telephone network. The non-volatile portion also stores frequency data received from the host system. The volatile portion stores data entered by the listener. For example, the volatile portion may store geographic information entered by the listener before the information is transmitted to the host system through the modem 68. The present invention is not limited to two memories 64 and 66 or to any particular type of memory.

For controlling the operation of the radio receiver and communicating with the host system, the frequency scanning radio receiver includes an input device, such as keyboard 72. The keyboard 72 may include one or more alphanumeric keys for manually programming the radio receiver. The keyboard 72 preferably also includes a "program" key that initiates a program stored in memory to connect the radio receiver to the host system via the modem 68 for receiving frequency data. The listener may also use the keyboard to alter the frequency data received from the host system. For example, the listener may desire to program the frequency scanning radio receiver manually to monitor a frequency in addition to the frequencies included in the frequency data prepared by the host system. Accordingly, the keyboard 72 allows the operator to access a programming data set stored in the memory 66 to make additions and/or deletions to the frequency data.

The radio receiver includes a display 74 for displaying user identification information to a listener. Displaying the identification of a transmitting party enables the listener to identify the source of a transmission quickly and accurately. In order to display user identification data, the CPU 62 reads the frequency data in the memory 66 and transmits the identification data to the display 74. The display 74 may be any type of display suitable for displaying information to an operator, such as a liquid crystal display, a light emitting diode display, or a graphics display, such as an SVGA display. In the illustrated embodiment, the display 74 comprises an LCD display with an LCD controller 76. The display 74 also displays programming status information to the listener. For example, when the radio receiver is receiving frequency data from the host system, the display 74 may display "Programming in Progress".

Figure 7:
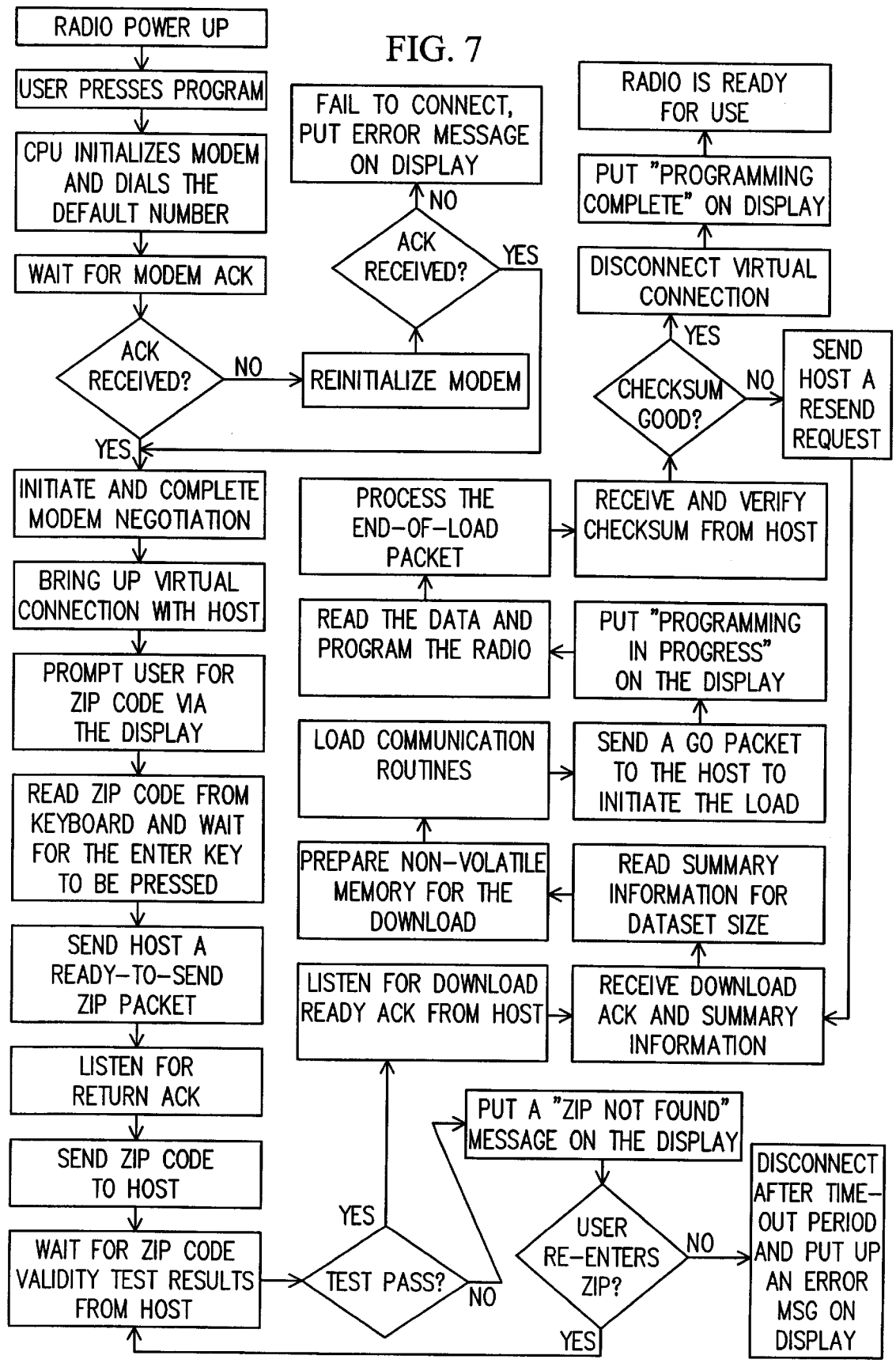
FIG. 7 is a flow chart illustrating an example of frequency scanning radio receiver programming according to an embodiment of the present invention.

FIG. 7 illustrates an example of the operation of the frequency scanning radio receiver according to an embodiment of the present invention during automatic programming. In order to automatically program a radio receiver, the listener presses the "program" key on the keyboard 72, causing the CPU 62 to execute an automatic programming routine stored in the memory 64. The CPU 62 transmits a request signal to the modem 68 to dial a default telephone number for the host system, stored in the non-volatile portion of memory 66. The CPU 62 then waits for an ACK signal from the modem 68 indicating that the request was successfully received. If no ACK is received within a predetermined time period, the CPU 62 reinitializes the modem 68 and resends the request. The CPU 62 preferably retries the request a predetermined number of times, then sends an error message to the display 74.

Once the modem 68 successfully connects with the modem of the host system, the modems perform handshaking and agree on common characteristics, for example, baud rate. Upon successful completion of handshaking, a serial communications link is established between the host system hardware and the scanning radio hardware. Any serial communications protocol for transmitting and receiving data electronically may be used. In a preferred embodiment, the communications protocol comprises an RS232 protocol.

Once the connection is established, the radio receiver modem 68 sends a signal to the CPU 62 indicating that the connection was successful. The CPU 62 then sends a message to the display 74 that prompts the listener to enter programming request information, for example, a postal code. The listener preferably enters a postal code for the geographic location where the listener desires to monitor radio frequency transmissions. As an alternative to a postal code, the listener's telephone number may be used. The geographic code is entered using the keyboard 72. When the "enter" key is pressed, the CPU 62 indicates to the host system that a postal or other geographic code is ready to be sent. The host system receives this message and sends an acknowledgment signal when it is ready to receive the code. Again, the radio may wait for a predetermined time period and resend the ready-to-send signal if the host does not respond within the predetermined period.

Once the radio receiver receives the acknowledge signal from the host, the radio receiver sends the code to the host system. The radio CPU 62 waits for the host to send an acknowledge signal. The radio CPU 62 may wait for a predetermined time period and resend the code if the host does not respond within the predetermined time period. Upon receiving the code, the host system searches the geographic information database 30 for the postal or other locality code. If the host system is unable to locate the geographic information, the host system sends a signal to the CPU 62 indicating that the code entered by the operator is invalid. The CPU 62 sends a message to the display 74 indicating that the code is invalid. The CPU 62 preferably prompts the listener to enter a valid code. If the user enters a valid code within a predetermined time period, the host system uses the new code to extract a city or town, and uses the city or town to extract frequency allocation data. If the user does not enter a valid code, the host system preferably includes a time out function that breaks the connection with the scanning radio receiver. The time out feature prevents a frequency scanning radio receiver from tying up host system resources with an invalid code.

When the host system has created the frequency data, as described above, the host system sends a ready-to-send signal to the CPU 62. The signal includes the size of the frequency data. The CPU 62 prepares a non-volatile portion of the memory 66 to receive the frequency data and sends an acknowledge signal to the host. The host then sends the frequency data to the frequency scanning radio receiver.

The CPU 62 preferably verifies the validity of the data received from the host system, e.g., by verifying size and checksum information transmitted with the data. The CPU 62 then preferably sends a message to the display 74, indicating that the data was received successfully, for example, "Programming Complete". In this manner, the host system automatically programs the frequency scanning radio receiver from a remote location. The only actions required by the listener are pressing a "program" key and entering a geographic code such as a postal, e.g., zip, code.

The CPU 62 stores the frequency data in the non-volatile portion of the memory 66 and uses the frequency data to control the tuner 61. For example, the FREQUENCY fields in the records of the frequency data may define a set of frequencies that the radio receiver scans, excluding all other frequencies. Alternatively, the radio receiver may scan a continuous range of frequencies and stop to monitor a transmission only if the transmission occurs at one of the frequencies indicated in the FREQUENCY fields of the records stored in the memory 66.

According to another feature of the present invention, the memory locations in which the CPU 62 stores the records of the frequency data may be used to define the frequencies that the radio receiver scans. For example, the memory 66 may be divided into banks and sub-banks. The banks may be physical divisions in the memory 66, i.e., separate chips, or virtual divisions, separated by addresses. A bank or sub-bank may be used to define a subset of frequencies that a listener desires to monitor. For example, the listener may desire to monitor only state police transmissions. The keyboard 72 may include a "State" key and a "Police" key. If the operator presses both keys, the CPU 62 reads the frequencies stored in the state bank and the police sub-bank, and the radio receiver then monitors only state police transmissions. Similar keys may be included for selection of other subsets of frequencies for monitoring.

An exemplary method by which the CPU 62 arranges the frequency data received from the host system into banks and sub-banks utilizes the modified service code in each record. For example, each record includes a frequency, a description or identification of the transmitting party, and a modified service code. An exemplary record may comprise, "33.660;Westford Fire;TF". The CPU 62 may use the first character in the service code field to specify a bank in memory and the second character to specify a sub-bank, or vice versa. For example, the first characters T, C, S, and R may specify city, county, state, and regional banks, respectively.

The second characters P, F, H, and L may specify police, fire, highway, and government sub-banks, respectively. The present invention is not limited to storing records in banks and sub-banks. The frequency data may be arranged in memory in any manner for selective access of the records and control of the tuner 61.

A frequency scanning radio according to the invention identifies the transmitting party to the listener. In an exemplary embodiment, USER fields in the frequency data received from the host system comprise the user identification data that is displayed to the listener. As discussed above, the host system modifies the USER field of a record to contain a description of the transmitting party. Each record includes a FREQUENCY field in addition to the USER field. When a transmission occurs at the frequency stored in the FREQUENCY field, the radio receiver identifies the transmitting party and displays the identity to the listener. For example, for the record, "33.660 Westford Fire TF", if the receiver 60 receives a transmission at a frequency of 33.660 MHz, the CPU 60 transmits a signal to the display 74 that displays "Westford Fire". In this manner, the receiver displays the identity of a transmitting party to the listener. The present invention is not limited to displaying particular identifying information. Displaying any identifying information in addition to or instead of the transmitting party, including frequency, is within the scope of the invention.

Figure 8:
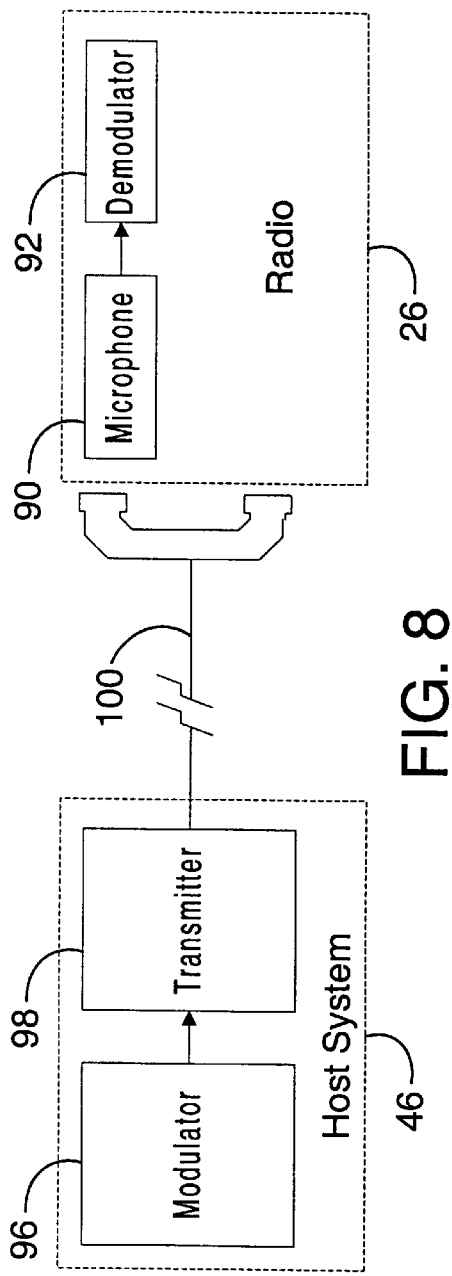
FIG. 8 is a block diagram of a frequency scanning radio receiver programming apparatus according to an alternative embodiment of the present invention.

Although the described embodiments illustrate a frequency scanning radio receiver that connects to a host system through a telephone network using a modem, the present invention is not limited to a telephone network connection. FIG. 8 illustrates an alternative embodiment in which a scanning radio receiver 2b includes an acoustical modem comprising a microphone circuit 90, and a demodulator circuit 92 for receiving frequency data from a host system 4b in a modulated audio format, e.g., via a telephone handset 94. The host system 4b according to such an embodiment includes an audio modulator circuit 96 and an audio transmitter circuit 98 for transmitting a modulated audio signal over a telephone network 100. Any modulation scheme capable of transmitting audio signals to the scanning radio receiver through a telephone network may be used. For example, the audio data may be frequency modulated, amplitude modulated, or phase modulated. In operation, a listener dials a telephone number for the host system 4b using a telephone. When the host system 4b answers, the listener places the telephone handset 94 proximate the microphone 90, and inputs a code for a geographical area. The host system 4b receives the code and retrieves the frequency data, as discussed above. The modulator circuit 96 then transforms the frequency data into a modulated audio signal and the transmitter circuit 96 transmits the signal to the frequency scanning radio receiver 2b through the microphone circuit 90. The demodulator circuit 92 demodulates the signal into a digital format usable by the radio receiver 2b.

Figure 9:
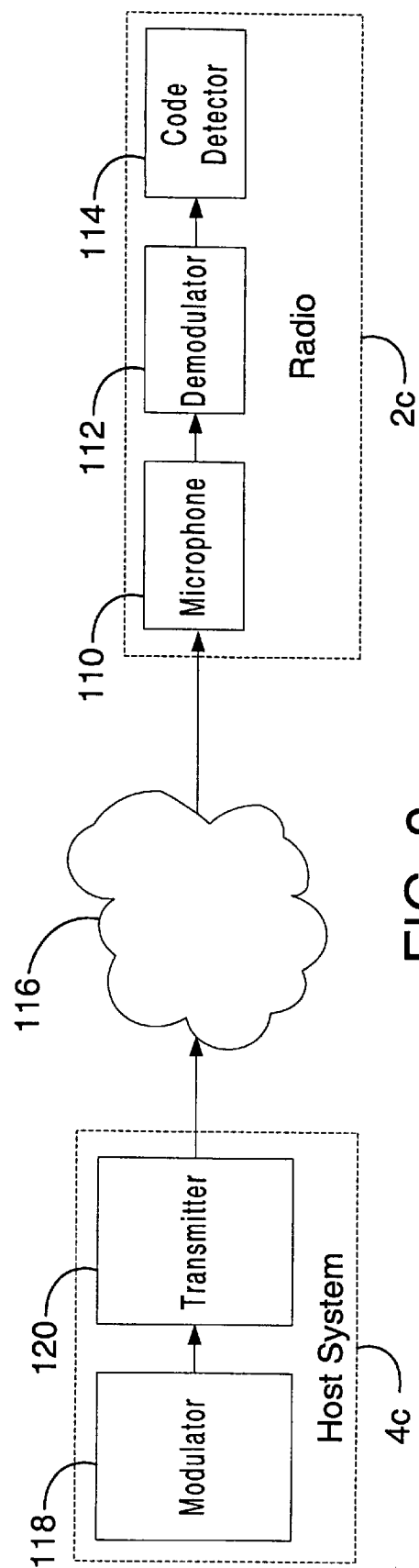
FIG. 9 is a block diagram of a frequency scanning radio receiver programming apparatus according to another alternative embodiment of the present invention.

In another alternative embodiment, a scanning radio may be automatically programmed using a wireless network, for example, a pager network. The pager network comprises a network of antennas that transmit digital information to personal pager devices. FIG. 9 illustrates a scanning radio receiver programming system according to the present embodiment.

In yet another embodiment, a scanning radio may be automatically programmed through a connection to the Internet. In that arrangement, the scanning receiver includes an appropriate input port, such as an RS232 port, that may be directly connected to a computer or to an external modem. In use, the computer or external modem establishes communication with the Internet which provides questions for the user so that the appropriate programming information can be directly supplied to the scanning receiver.

A frequency scanning radio receiver 22c according to the illustrated embodiment includes a radio frequency receiver 110. The receiver 110 may be separate from the receiver used to monitor radio frequency transmissions, or the receiver 110 may be a part of the same receiver used to monitor radio frequency transmissions.

The frequency scanning radio receiver 2c includes a demodulator circuit 112 coupled to the receiver 110 to demodulate frequency data sent from the host system. A code detector circuit 114 is coupled to the demodulator circuit 112 to determine if frequency data sent from the host system through a wireless network 116 is addressed to the frequency scanning radio receiver. For example, the code detector circuit 114 may be programmed or manufactured to receive data when the identification code comprises the serial number of the frequency scanning radio receiver. Additional circuits, such as the CPU and memories, are included in the frequency scanning radio receiver 2c but are not shown in FIG. 9.

A host system 4c according to the illustrated embodiment includes a modulator circuit 118, for example, a frequency modulator circuit, to modulate the frequency data that is to be transmitted to the frequency scanning radio receiver 2c over the wireless network 116. The host system also includes a transmitter for transmitting data to the pager network 116. For example, if the host system connects to the wireless network via an RF link, the transmitter circuit includes an RF transmitter circuit. Additional circuits such as a CPU and memories are included, but are not shown in FIG. 9. The host system 4c may also include an automated is telephone answering system (not shown) to receive programming requests from frequency scanning radio receiver listeners and to input the requests to the host system CPU.

In operation, a listener calls a telephone number for the host system using a telephone. The host system 4c answers the call, e.g., either using a human operator or an automated answering system. The host system 4c then prompts the listener for identification information used to address the frequency scanning radio receiver 2c, for example, a serial number of the frequency scanning radio receiver 2c. The listener then either manually or vocally inputs the response using the telephone. The host system 4c prompts the listener for geographical information regarding the location for monitoring transmissions. The listener enters the geographic information, e.g., a postal code, to the host system. The host system uses the geographical information to extract frequency data from the databases, as discussed above. The host system uses the identification information entered by the listener to address the frequency scanning radio receiver. For example, the identification information may be a digital signal that precedes the programming information in a transmission through the wireless network 116. The modulator circuit 118 preferably converts the ID code and the programming data into a modulated signal, for example, a frequency modulated signal and transmits the signal to the wireless network 116. The wireless network 116, through the network of RF antennas, transmits the data to the frequency scanning radio receiver 2c. The frequency scanning radio receiver 2c receives the transmission using the receiver 110. The demodulator circuit 112 demodulates the signal into a digital format. The code detector circuit 114 detects if a transmission is directed to its frequency scanning radio receiver and, if so, alerts the CPU to the incoming frequency data. The CPU stores the frequency data in memory.

In this manner, the receiver is automatically programmed using a wireless network.

While the invention has been described in some detail by way of illustration and example, the invention is susceptible to various modifications and alternative forms, and is not restricted to the specific embodiments disclosed. It should be understood that these specific embodiments are not intended to limit the invention but, on the contrary, the intention is to cover all modifications, equivalents, and alternatives falling within the spirit and scope of the invention as defined in the following claims.

What is claimed is:

1. A programmable frequency scanning radio receiver comprising:
    a receiver for receiving radio frequency transmissions at each of a plurality of discrete frequencies;
    a memory for storing frequency data, the frequency data including a plurality of frequencies corresponding to respective transmitting parties of interest;
    a processing circuit coupled to the memory and the receiver, accessing the memory, and controlling the receiver to monitor transmissions only at the frequencies of the frequency data; and
    a communication device coupled to the processing circuit for communicating with a host system located remotely from the receiver and receiving the frequency data from the host system, the processing circuit storing the frequency data in the memory, whereby the frequencies to be monitored by the receiver can be established and altered from a data base in the host system.

2. The programmable frequency scanning radio receiver according to claim 1 wherein the frequency data comprises identification data identifying the transmitting parties corresponding to the frequencies and the receiver comprises a display for displaying the identification data.

3. The programmable frequency scanning radio receiver according to claim 1 wherein the communication device comprises a modem.

4. The programmable frequency scanning radio receiver according to claim 1 comprising an input device coupled to the processing circuit for entering a programming request and actuating the communication device to communicate with the host system to receive the frequency data.

5. The scanning radio receiver according to claim 4 wherein the programming request includes a postal code identifying a geographic location of the receiver to the host system.

6. The scanning radio receiver according to claim 1 wherein the communication device comprises a receiver for receiving a modulated audio signal from the host system.

7. The scanning radio receiver according to claim 1 wherein the communication device receives the frequency data through a wireless network.

8. A host system for programming a frequency scanning radio receiver comprising:
    a communication device for transmitting frequency data to a frequency scanning radio receiver in response to a programming request;
    a memory comprising a first data base of geographic codes identifying geographic locations of each of a plurality of transmitting parties and a second data base storing frequency allocation information for each of the transmitting parties; and
    means for extracting and processing a portion of the frequency allocation information from the memory in response to the programming request to produce the frequency data.

9. The host system according to claim 8 wherein the frequency allocation information comprises identification of the transmitting parties.

10. The host system according to claim 8 wherein the communication device comprises a modem.

11. The host system according to claim 8 wherein the means for extracting and processing comprises a search engine for extracting geographic information from the first database in response to a geographic code included in a programming request and extracting the frequency allocation information from the second database using the geographic information extracted from the first database.

12. The host system according to claim 11 wherein the means for extracting and processing comprises a parse engine for converting the frequency allocation information extracted from the second database into frequency data for transmission to the frequency scanning radio receiver.

13. The host system according to claim 12 wherein the parse engine processes the frequency allocation information so that the frequency data includes user identification data identifying respective transmitting parties.

14. The host system according to claim 8 further comprising a modulator circuit for converting the frequency data into a modulated audio signal for transmission to a frequency scanning radio receiver through a telephone network.

15. The host system according to claim 8 wherein the communication device comprises a wireless network interface circuit for transmitting the frequency data to a frequency scanning radio receiver through a wireless network.

16. A frequency scanning radio receiver programming system for programming frequency scanning radio receivers, the system comprising:
    a host system including:
        a first communication device for transmitting frequency data to a frequency scanning radio receiver in response to a programming request;
        a first memory storing frequency allocation information for each of a plurality of transmitting parties; and
        means for extracting and processing a portion of the frequency allocation information from the first memory in response to the programming request to produce the frequency data;
    a frequency scanning radio receiver including:
        a receiver for receiving radio frequency transmissions at each of a plurality of discrete frequencies;
        a second memory for storing frequency data, the frequency data including a plurality of frequencies corresponding to respective transmitting parties of interest;

a processing circuit coupled to the second memory and the receiver, accessing the second memory, and controlling the receiver to monitor transmissions only at the frequencies of the frequency data; and a second communication device coupled to the processing circuit for communicating with a host system located remotely from the receiver and for receiving the frequency data from the host system, the processing circuit storing the frequency data in the second memory, whereby the frequencies to be monitored by the receiver can be established and altered from a data base in the host system.

17. The frequency scanning radio receiver programming system according to claim 16 wherein the first memory comprises a first data base of geographic codes identifying geographic locations of the transmitting parties and a second data base storing the frequency allocation information.

18. The frequency scanning radio receiver programming system according to claim 17 wherein the means for extracting and processing comprises a search engine for extracting geographic information from the first data base in response to a geographic code included in a programming request and extracting the frequency allocation information from the second data base using the geographic information extracted from the first data base.

19. A method for automatically programming a frequency scanning radio receiver to monitor transmissions only on each of discrete frequencies comprising:

transmitting a programming request for a frequency scanning radio receiver to a host system, the programming request including a geographical location of the frequency scanning radio receiver;

in response to the programming request, assembling frequency data including respective operating frequencies for a plurality of transmitting parties proximate the geographical location of the frequency scanning radio receiver;

transmitting the frequency data from the host system to the frequency scanning radio receiver; and in response to the frequency data received from the host system, programming the frequency scanning radio receiver to monitor transmissions on the operating frequencies.

20. The method of claim 19 wherein the frequency data includes identification data identifying a transmitting party for each operating frequency and programming the frequency scanning radio receiver to display the corresponding identification data when receiving a transmission on an operating frequency.

* * * * *